(12) United States Patent
Bird et al.

(10) Patent No.: US 7,441,343 B2
(45) Date of Patent: Oct. 28, 2008

(54) SADDLE FIT SYSTEM AND METHOD

(75) Inventors: Carl Bird, Aptos, CA (US); Greg Grenzke, Santa Cruz, CA (US)

(73) Assignee: Specialized Bicycle Components, Inc., Morgan Hills, CA (US)

( * ) Notice: Subject to any disclaimer, the term of this patent is extended or adjusted under 35 U.S.C. 154(b) by 0 days.

(21) Appl. No.: 11/838,836

(22) Filed: Aug. 14, 2007

(65) Prior Publication Data

US 2007/0273185 A1 Nov. 29, 2007

Related U.S. Application Data

(63) Continuation of application No. 11/145,270, filed on Jun. 3, 2005, now Pat. No. 7,284,336.

(60) Provisional application No. 60/667,214, filed on Mar. 31, 2005.

(51) Int. Cl.
*A61B 5/103* (2006.01)
(52) U.S. Cl. .......................... 33/512; 33/515
(58) Field of Classification Search ............... 33/512, 33/515, 514.2; 297/195.1
See application file for complete search history.

(56) References Cited

U.S. PATENT DOCUMENTS

| | | | |
|---|---|---|---|
| 4,615,856 A | 10/1986 | Silverman | |
| 4,728,150 A | 3/1988 | Gaudreau, Jr. | |
| 4,993,429 A | 2/1991 | Krinsky | |
| 4,998,354 A | 3/1991 | Silverman et al. | |
| 5,060,393 A | 10/1991 | Silverman et al. | |
| 5,351,408 A | 10/1994 | Street | |
| 5,385,155 A | 1/1995 | Kittelsen et al. | |
| 5,470,590 A | 11/1995 | Brubaker et al. | |
| 5,911,474 A * | 6/1999 | Lee | 297/201 |

(Continued)

FOREIGN PATENT DOCUMENTS

EP 1698545 9/2006

(Continued)

OTHER PUBLICATIONS

SQ Popometer card.

(Continued)

*Primary Examiner*—Yaritza Guadalupe-McCall
(74) *Attorney, Agent, or Firm*—Knobbe Martens Olson & Bear LLP

(57) ABSTRACT

In an embodiment, a bicycle saddle fit system comprises first and second supports, a substrate coupled to the first and second supports, and a measurement gauge coupled to the substrate. The first and second supports are each configured to receive sit bones of an adult human. At least one of the first and second supports is selectively moveable to locate the sit bones and to define a sit bone width. The substrate is configured to facilitate the selective movability of the at least one of the first and second supports. The measurement gauge is configured to visually indicate the sit bone width. In another embodiment, a method of fitting a bicycle saddle to a human rider comprises locating the first and second sit bones of the rider, reading a sit bone width from the measurement gauge, and assessing a saddle characteristic based on the rider's sit-bone width.

30 Claims, 11 Drawing Sheets

U.S. PATENT DOCUMENTS

| | | | |
|---|---|---|---|
| 6,106,059 A | 8/2000 | Minkow et al. | |
| 6,161,238 A | 12/2000 | Graebe | |
| 6,402,235 B1* | 6/2002 | Letendre | 297/195.1 |
| 6,402,236 B1* | 6/2002 | Yates | 297/201 |
| D469,703 S | 2/2003 | Stahl | |
| 6,615,568 B1 | 9/2003 | Roskies | |
| 6,625,897 B2 | 9/2003 | Tadin | |
| 6,769,234 B2 | 8/2004 | Hadlock | |
| 6,990,744 B2 | 1/2006 | Bieganek et al. | |
| 7,284,336 B2 | 10/2007 | Bird et al. | |
| 2002/0185897 A1* | 12/2002 | Crutch | 297/195.1 |
| 2004/0232742 A1 | 11/2004 | Oehler | |

FOREIGN PATENT DOCUMENTS

WO    WO03/011679 A1    2/2003

OTHER PUBLICATIONS

"SQ-lab wants to put through a ergonomic bike part concept, together with bike shops." <www.sq-lab.com/englisch/press.htm> (English version of article originally published in German in Feb. 2004).

"Saddles That Keep Blood Flowing," *Mountain Bike Action* magazine, Feb. 2005.

* cited by examiner

SADDLE FIT SYSTEM AND METHOD

CROSS-REFERENCE TO RELATED APPLICATIONS

This application is a continuation of U.S. application Ser. No. 11/145,270, filed Jun. 3, 2005 now U.S. Pat. No. 7,284,336, which claims the benefit of U.S. Provisional Application No. 60/667,214, filed Mar. 31, 2005, the entireties of which are hereby incorporated herein by reference.

BACKGROUND OF THE INVENTION

1. Field of the Invention

Certain embodiments disclosed herein relate to apparatus and methods for fitting a rider with a saddle, such as a bicycle saddle.

2. Description of the Related Art

For many years bicycle saddles have been designed with a convex upper surface on which the rider sits. These "traditional" bicycle saddles cause numbness in both male and female riders, resulting from pressure on the perineal area. In more extreme cases, a male rider can experience a decrease in blood flow in the pudendal arteries as a result of this pressure, which can lead to impotence.

To remedy this problem, saddle manufacturers have introduced a variety of saddles having a central groove and/or cutout which minimizes the pressure on the perineal area of the rider. These saddles have significantly improved rider comfort while reducing male riders' risk of cycling-related impotence.

Notwithstanding these recent improvements, the development of bicycle saddle ergonomics continues, as further attempts are made to improve the fitting of a saddle to a rider.

SUMMARY OF THE INVENTION

In one embodiment, a bicycle saddle fit system comprises an impression pad of sufficient size to span the sit bones of an adult human, and a measurement gauge fixed to and extending along the impression pad. The measurement gauge is usable to measure the distance between sit-bone impressions made in the impression pad by a person previously seated on the impression pad.

In another embodiment, a bicycle saddle fitting tool comprises a sit-bone impression region, and a width gauge fixed to the sit-bone impression region. The width gauge extends along the impression region to facilitate measurement of the distance between sit-bone impressions made in the region.

In another embodiment, a method of fitting a bicycle saddle to a human rider comprises measuring a sit-bone width of the rider, determining a preferred riding posture of the rider, and assessing a saddle characteristic suitable for the rider based on both the rider's sit-bone width and the rider's preferred riding posture.

Certain objects and advantages of the invention are described herein. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of the embodiments summarized above are intended to be within the scope of the invention herein disclosed. However, despite the foregoing discussion of certain embodiments, only the appended claims (and not the present summary) are intended to define the invention. The summarized embodiments, and other embodiments of the present invention, will become readily apparent to those skilled in the art from the following detailed description of the preferred embodiments having reference to the attached figures, the invention not being limited to any particular embodiment(s) disclosed.

DETAILED DESCRIPTION OF THE PREFERRED EMBODIMENT

Figure 1:
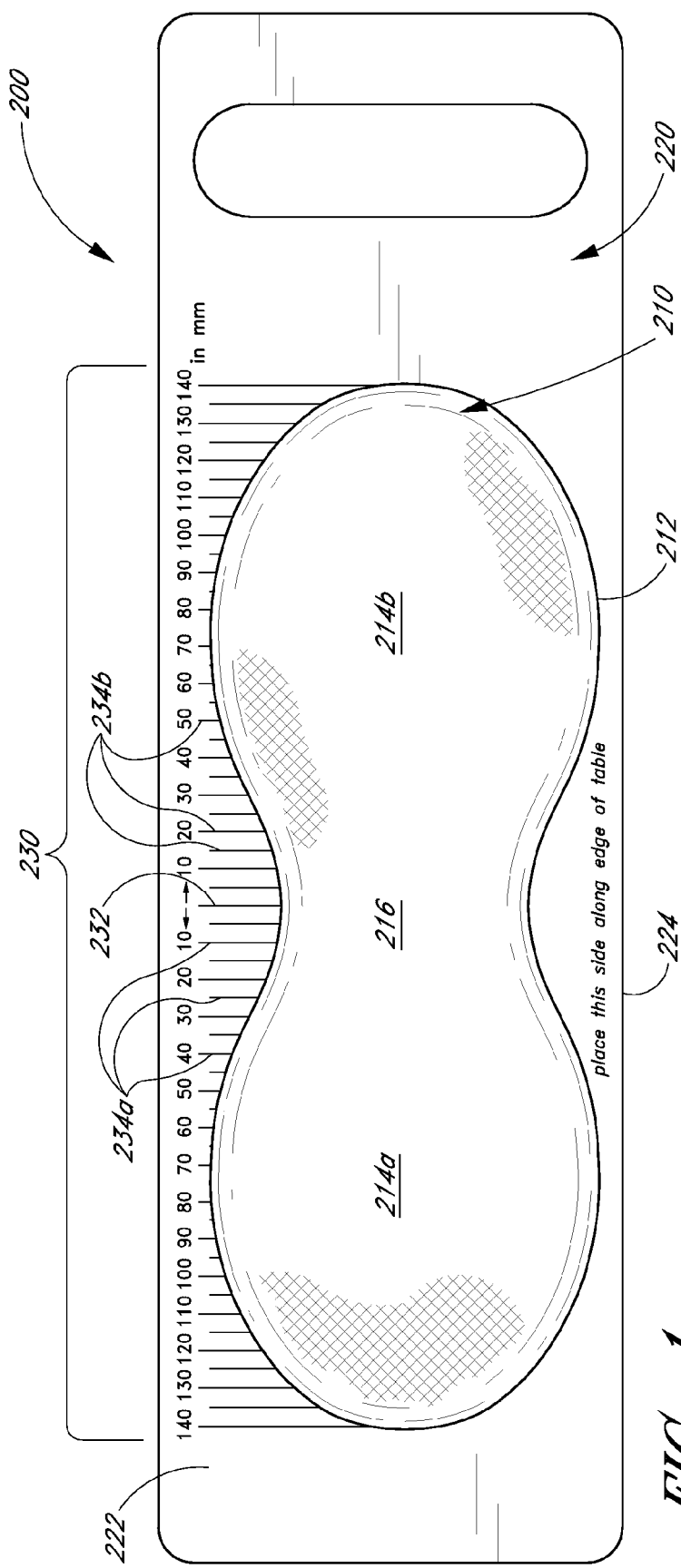
FIG. 1 is a plan view of one embodiment of a saddle fitting tool.
Figure 2:
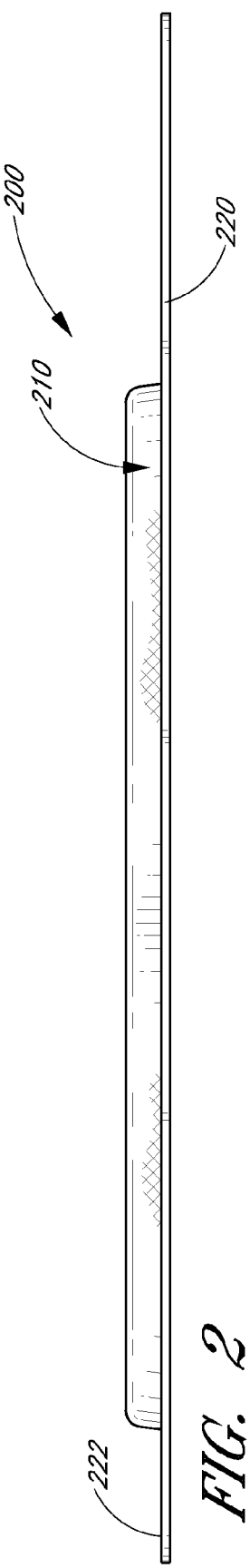
FIG. 2 is an elevation view of the fitting tool of FIG. 1.
Figure 3:
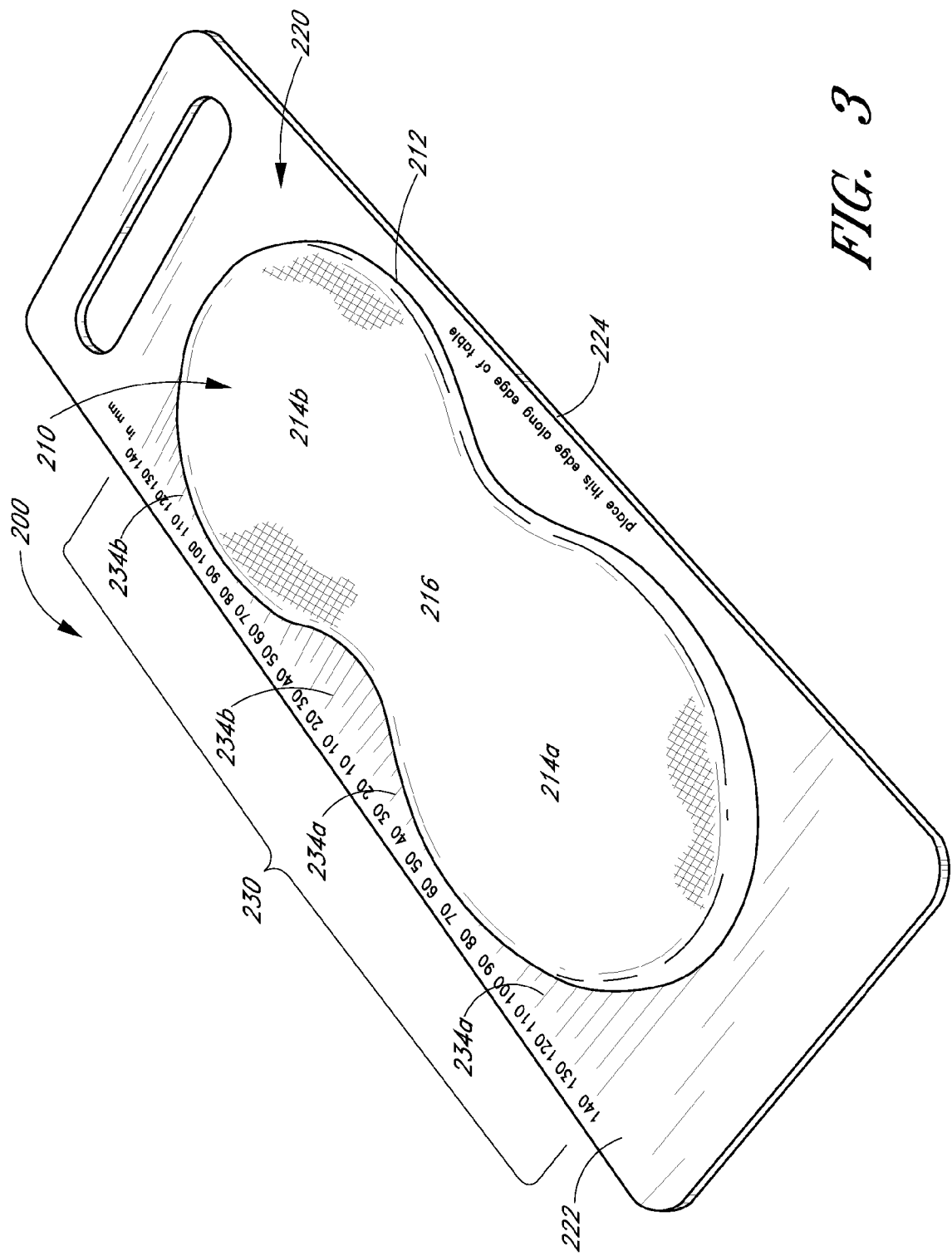
FIG. 3 is a perspective view of the fitting tool of FIG. 1.

FIGS. 1-3 depict one embodiment of a saddle fitting tool 200. The saddle fitting tool 100 is usable to fit a saddle, preferably a bicycle saddle, to a human rider by measuring the distance between the ischial tuberosities (or "sit bones") of the rider's pelvis.

The depicted embodiment of the fitting tool 200 generally comprises an impression pad 210 which is affixed to and overlies a substrate layer 220. The substrate layer 220 preferably includes an exposed portion 222 which extends laterally beyond the perimeter of the impression pad 210. A measurement gauge 230 is located on the exposed portion 222 of the substrate layer 220, and extends along the impression pad 210. (Alternatively, the measurement gauge may be located on a separate device or ruler which is used in combination with the impression pad 210.)

The impression pad 210 preferably comprises a layer of shape-memory material such as foam, foam rubber, memory foam, or alternatively cardboard or clay. More generally, the impression pad 210 can comprise any material that is sufficiently compressible to form, at least temporarily, impressions of the sit bones of an adult or juvenile human recently seated on the impression pad. Where the impression pad 210 is formed from a material which forms such impressions only temporarily, the material preferably has sufficient shape memory to "hold" the impressions long enough to permit the measurement of a distance between the impressions as further discussed below. Such an impression pad 210 can therefore be configured to hold the impressions for at least 2 seconds, at least 5 seconds, or at least 10 seconds in various embodiments.

The material of the impression pad 210 can be selected to form sit bone impressions via plastic or elastic deformation. Advantageously, a material that forms sit-bone impressions only temporarily facilitates repeated measurements with the same impression pad, which in turn permits a user to take multiple measurements of sit-bone width and average the measurements for improved accuracy. The impression pad 210 can therefore be configured to hold the impressions for less than about 1 minute, or less than about 30 seconds, or less than about 10 seconds, in various embodiments.

The impression pad 210 is preferably sufficiently large to span the sit-bone width of a large adult human pelvis. Alternatively, a smaller impression pad 210 may be employed, for example in a fitting tool 200 intended for use only with children. The size of the impression pad 210 is preferably selected to include additional area beyond the largest sit-bone width that the pad 210 is intended to accommodate. In the depicted embodiment, the impression pad 210 is a layer of memory foam about 280 mm wide with a maximum depth of about 100 mm and a thickness of about 10 mm. Of course, these are only preferred dimensions and they may be varied as is appropriate. In various embodiments, the width of the impression pad 210 can be about 150-350 mm, about 160-320 mm, or about 180-280 mm.

The perimeter 212 of the impression pad 210 can have any suitable shape; however, in the depicted embodiment the perimeter 212 has a shape approximating that of an hourglass, defining first and second lobes 214a, 214b and a thinner neck portion 216 therebetween. The depicted "hourglass" shape advantageously assists the user in centering the impression pad before the user sits on it (discussed in further detail below).

The substrate layer 220 preferably comprises a relatively stiff layer of cardboard; alternatively, other relatively stiff materials such as acrylic, plastics, aluminum, wood, etc. may be employed. As still another alternative, a relatively pliable material such as rubber may be used to construct the substrate layer 220.

As previously mentioned, the substrate layer 220 includes a measurement gauge 230 that extends along the impression pad 210. The depicted measurement gauge 230 has a central "zero" point 232 and left-side and right-side markers 234a, 234b, each of which count up from zero as they proceed outwardly from either side of the zero point 232. This arrangement of the markers 234a, 234b and zero point 232 facilitates easy and accurate measurement of sit-bone width as will be discussed in further detail below. It is contemplated that other configurations of the measurement gauge 230 may be employed, such as one with markers that count up from a zero point located at one end of the gauge. The measurement gauge can be denominated with millimeters as shown, or with centimeters, inches, or any other suitable measurement unit. The depicted markers 234a, 234b are oriented generally perpendicular to the widthwise axis of the impression pad 210.

In still other embodiments, the measurement gauge 230 can be located partially or wholly on the impression pad 210 itself. For example, the markers 234a, 234b may extend from the substrate layer 220 onto the impression pad 210. Where the measurement gauge 220 is located entirely on the impression pad 210, the substrate layer 220 (or at least the exposed portion 222 thereof) may be omitted. In yet another embodiment, the measurement gauge 230 may be omitted from the tool 200, and a separate measurement device may be used to determine the distance between impressions in the pad 210.

In the depicted embodiment, the substrate layer 220 forms a straight edge 224 which extends generally parallel to the widthwise axis of the impression pad. The straight edge 224 is useful for alignment of the tool 200 on a tabletop or the like for making measurements, as will be demonstrated below.

FIGS. 4-7 depict one embodiment of a method of fitting a saddle to a rider. The various embodiments of fitting methods described herein may be performed with any of the embodiments of the fitting tool 200 described herein, or with any other suitable fitting tool.

Figure 4:
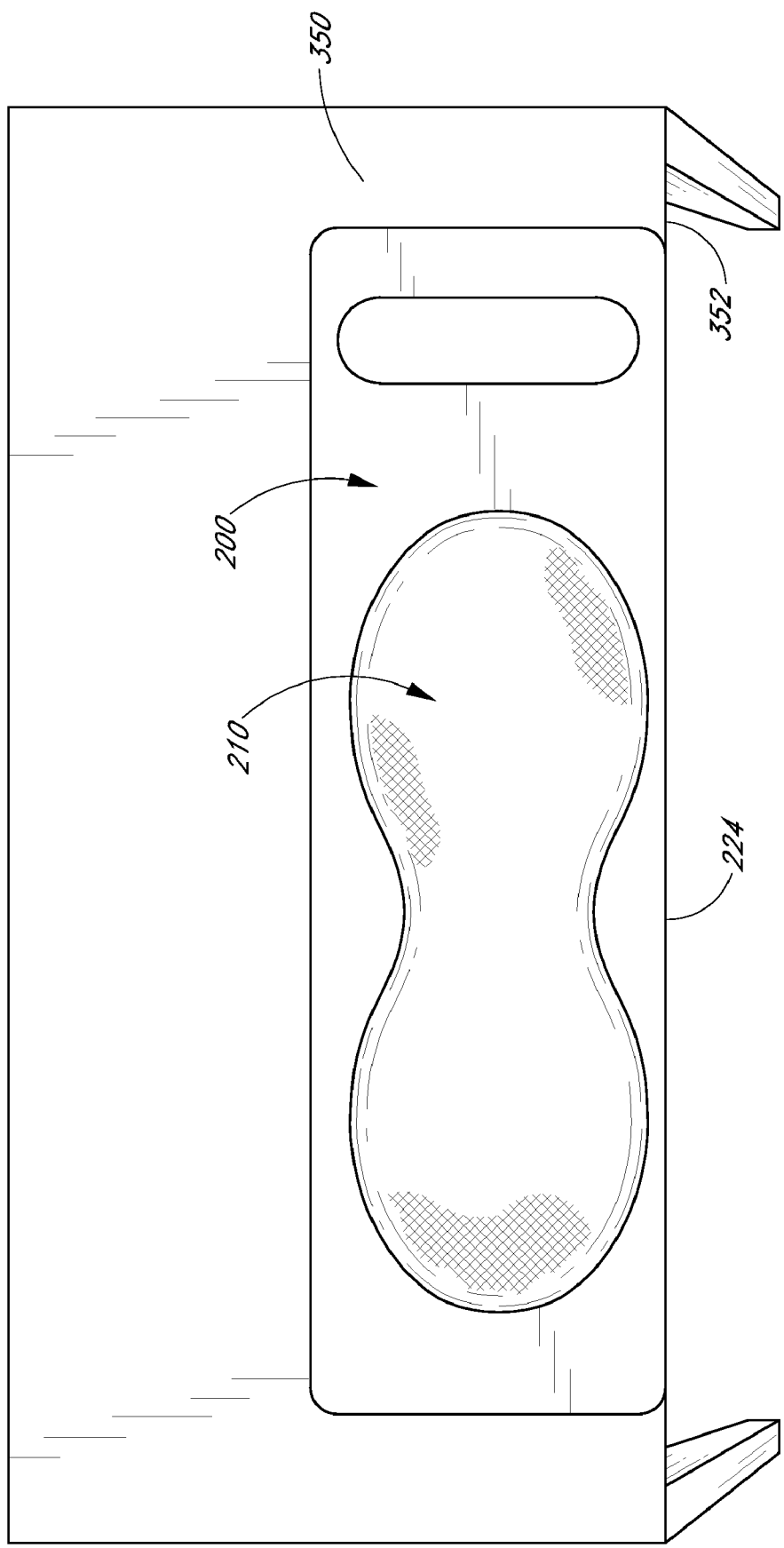
FIG. 4 is a schematic view of the fitting tool of FIG. 1, as situated on a tabletop for use.

In the depicted method the fitting tool 200 is first placed on a sturdy, level surface such as the tabletop 350 shown in FIG. 4. Of course, other sturdy surfaces may be employed, such as a stool, flat bench, staircase, floor, etc. The straight edge 224 can be used to align the fitting tool 200 with a forward edge 352 of the tabletop 350, to orient the fitting tool 200 generally parallel to the shoulders of a user standing in front of the tabletop.

Figure 5:
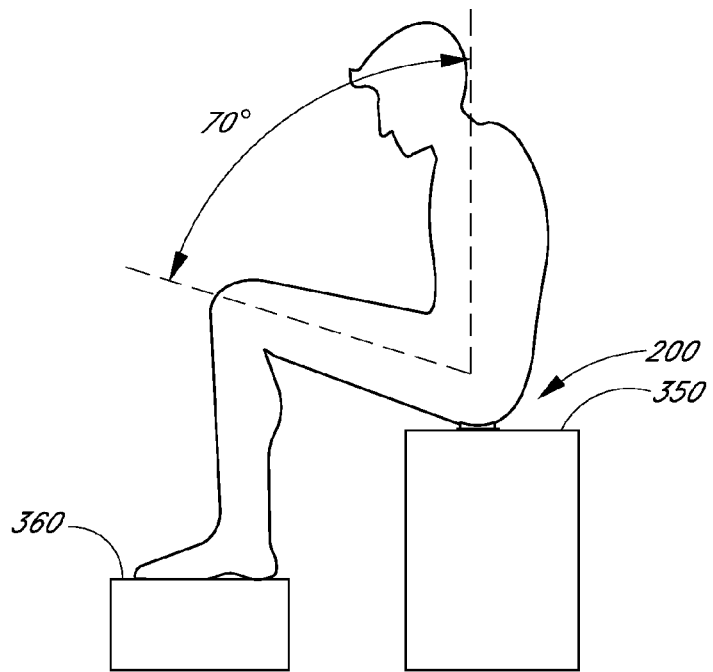
FIG. 5 is an elevation view of the fitting tool of FIG. 1, in use to measure a sit bone width of a user.

The user then sits on the impression pad 210 such that both of the user's sit bones press against the pad 210 (see FIG. 5). Preferably, where the tool employed includes the central zero point 232, the user sits on the impression pad 210 such that the sit bones press against the pad 210 on opposite sides of the zero point 232. As seen in FIG. 5, the user preferably sits on the impression pad 210 in a slightly forward-leaning posture, and/or with the knees slightly raised to create a knee-to-back angle of approximately 70 degrees. (Other knee-to-back angles may be employed by the user and/or indicated on the fitting tool 200 as desired.) A foot support 360 can be provided to support the feet of the user and facilitate the raised-knee posture of FIG. 5.

Figure 6:
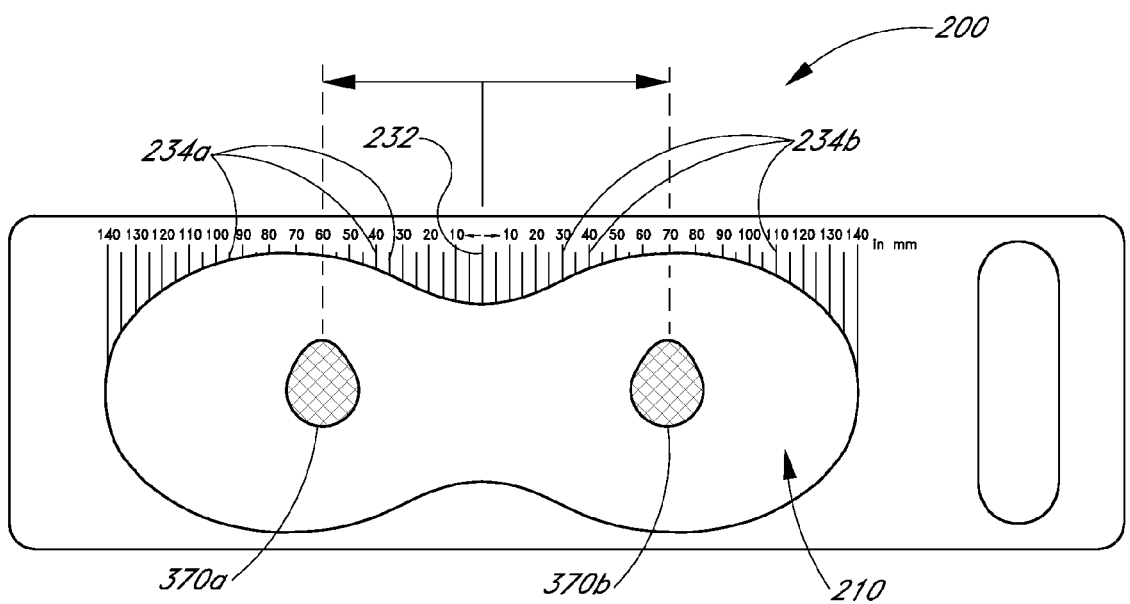
FIG. 6 is a plan view of the fitting tool of FIG. 1, depicting the measurement of sit-bone impressions made in an impression pad of the fitting tool.

The sit bones of the seated user create sit-bone impressions 370a, 370b in the impression pad 210 (see FIG. 6). After the user has stood up from the impression pad 210, he or she can measure the distance between the impressions 370a, 370b to determine his or her sit-bone width. Preferably the user measures the distance between the approximate centers of the impressions to determine sit-bone width; alternatively the user can measure the distance between the inner edges of the impressions, the distance between the outer edges of the impressions, or the distance between any suitable points of the impressions, to determine sit-bone width.

Where the tool 200 includes the measurement gauge 230 of the type shown in FIG. 6, the user's sit-bone width can be determined quickly and easily as follows. By using the left-side markers 234a, the user determines the distance (as measured along the widthwise axis of the impression pad 210) between the center (or other appropriate point) of the left-side impression 370a and the zero point 232. Due to the depicted arrangement of the measurement gauge 230, the user can simply read this "left-side distance" from the left-side marker(s) 234a that correspond most closely to the center of the left-side impression. The process is then repeated with respect to the right-side impression 370b, to determine a right-side distance between the center (or other appropriate point) of the right-side impression 370b and the zero point 232. The left-side distance and right-side distance are added to arrive at the sit-bone width of the user. In the example shown in FIG. 6, the position of the impressions 370a, 370b relative to the zero point 232 has resulted in a left-side distance of 60 mm and a right-side distance of 70 mm, yielding a sit-bone width of 130 mm.

In one embodiment, the user's sit-bone width alone can be used to fit a saddle to the user, and/or otherwise assess a saddle characteristic suitable for the user. However, in another embodiment a preferred riding posture of the user can be used in addition to (or instead of) the sit-bone width, to fit a saddle to the user, and/or otherwise assess a saddle characteristic suitable for the user.

Figure 7:
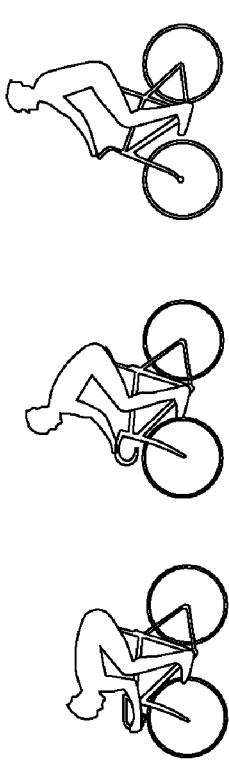
FIG. 7 is a chart depicting the use of sit bone width and preferred rider posture to fit a saddle to a user.

The preferred riding posture of the user, which is indicative of the posture that the rider prefers to assume when actually riding a bicycle, can be determined by selecting a riding posture from a group of several predetermined riding postures. For example, as shown in FIG. 7, the user can select a preferred riding posture from three predetermined riding postures: "aero" in which the rider's torso is bent far forward, as is common when a fast-moving road cyclist uses the "drop" portion of the handlebars; at the other extreme, "upright" in which the rider's torso is bent only slightly forward, characteristic of a more leisurely cyclist using a relatively high-mounted handlebar; or a midrange posture between aero and upright. In other embodiments, more or fewer predetermined riding postures can be provided for the user to choose from.

In the depicted embodiment, the combination of sit-bone width and preferred riding posture is used to determine a saddle width which is suitable for the rider. For example, using the chart in FIG. 7 a rider who has a sit bone width of 100-130 mm and prefers an "aero" riding posture should use a saddle with a width of 143 mm.

Figure 8:
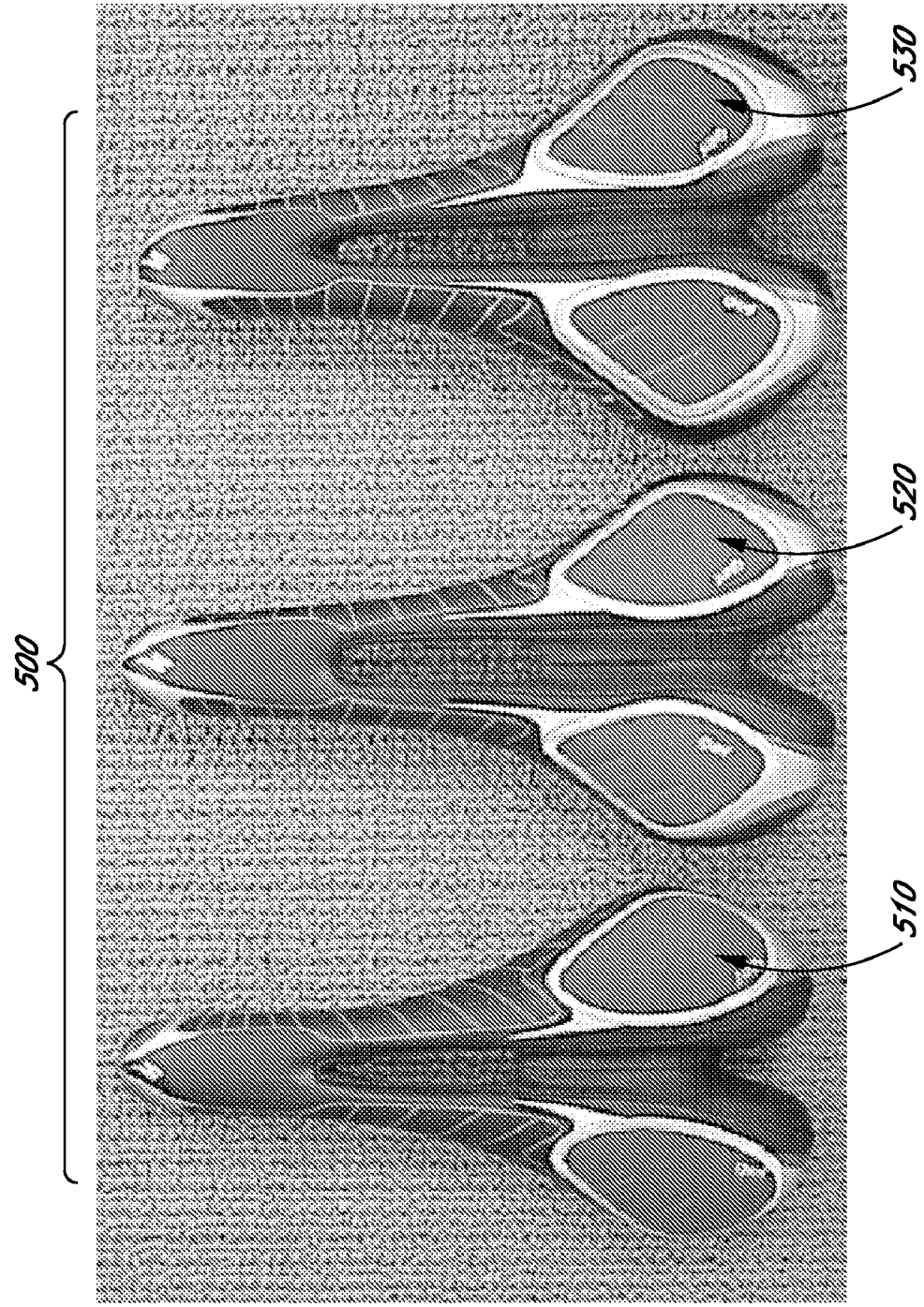
FIG. 8 is a plan view of one embodiment of a group of saddles for use with the fitting tool of FIG. 1.

More generally, the combinations of sit-bone width and preferred riding posture (or the sit-bone width or preferred riding posture alone) can be used to select a saddle type which is appropriate for the rider, from a group or range of saddle types. In the depicted embodiment, the combination of sit-bone width and preferred riding posture is used to select an appropriate saddle type from three available saddle types (130 mm, 143 mm, 155 mm). One embodiment of a group 500 of saddle types 510, 520, 530 is shown in FIG. 8. The depicted saddle types 510, 520, 530 are examples of the 130 mm, 143 mm and 155 mm saddle types discussed herein.

Figure 9:
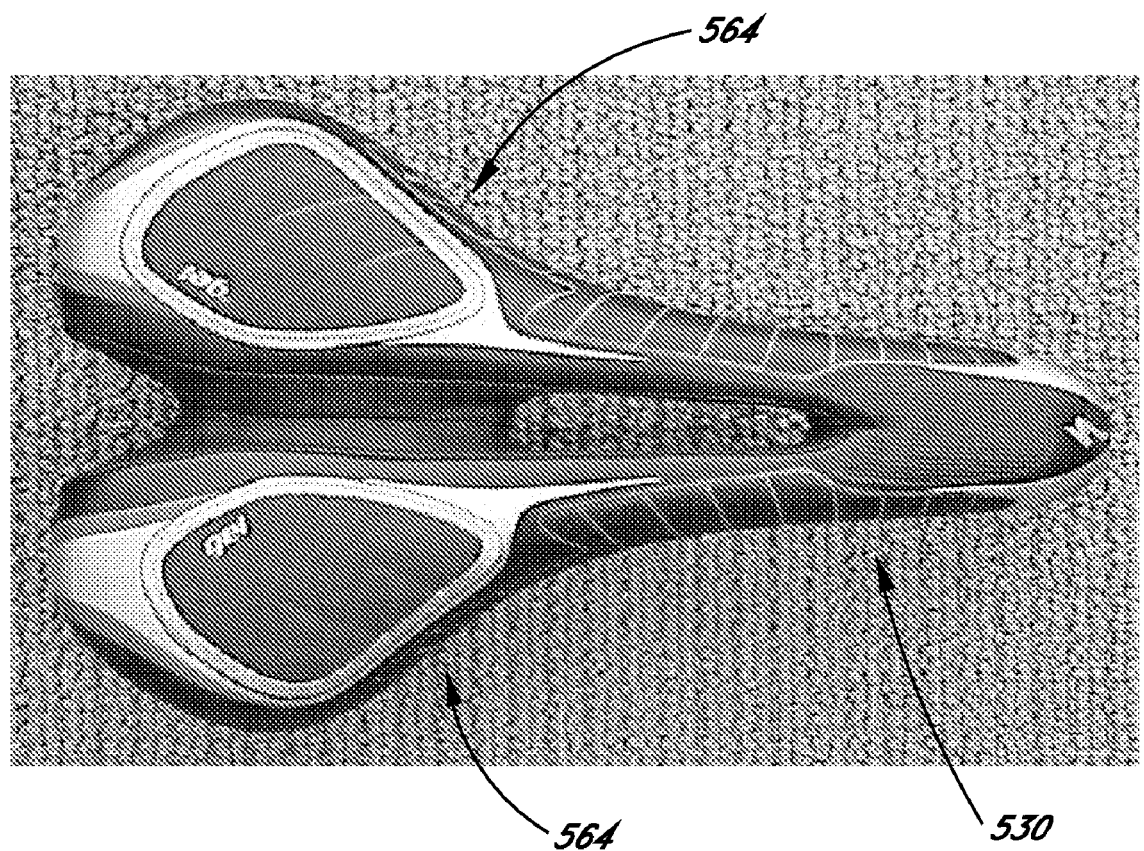
FIG. 9 is a plan view of one of the saddles of FIG. 8.
Figure 10:
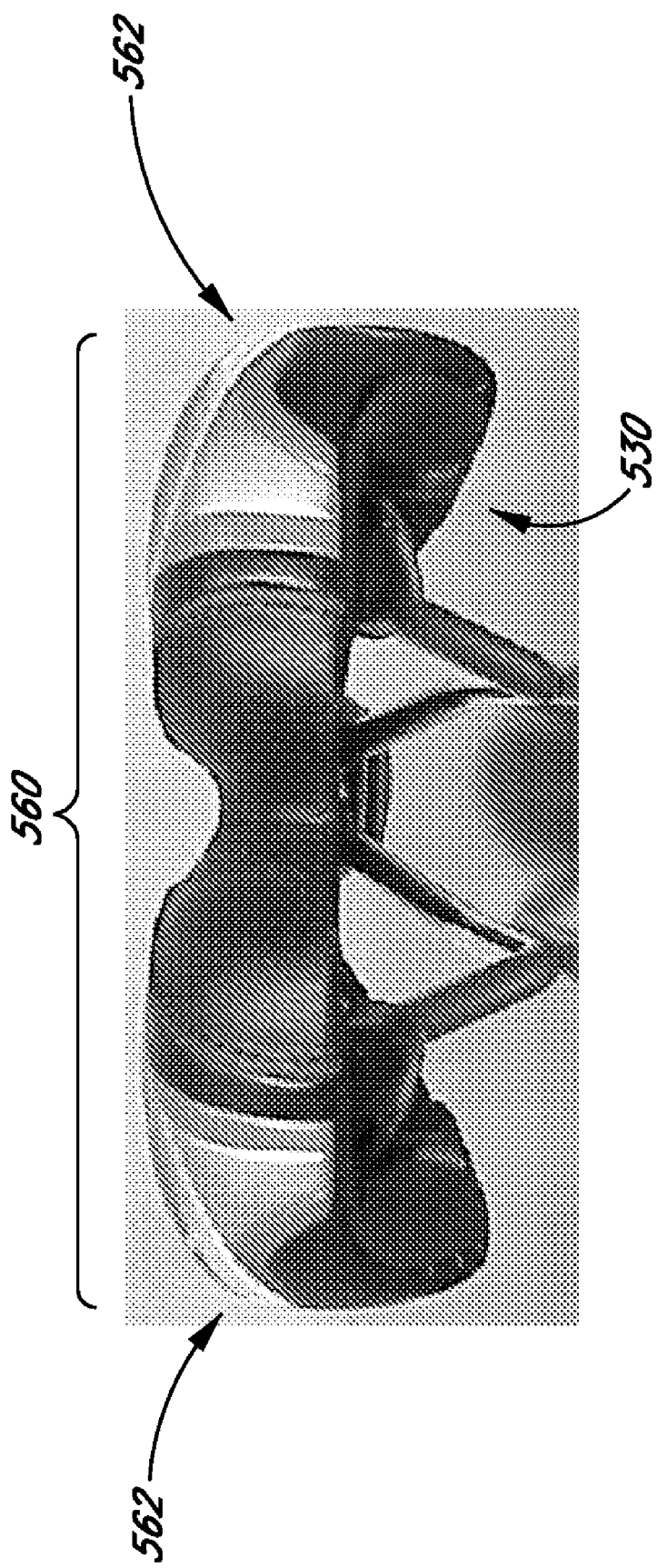
FIG. 10 is a rear elevation view of the saddle of FIG. 9.
Figure 11:
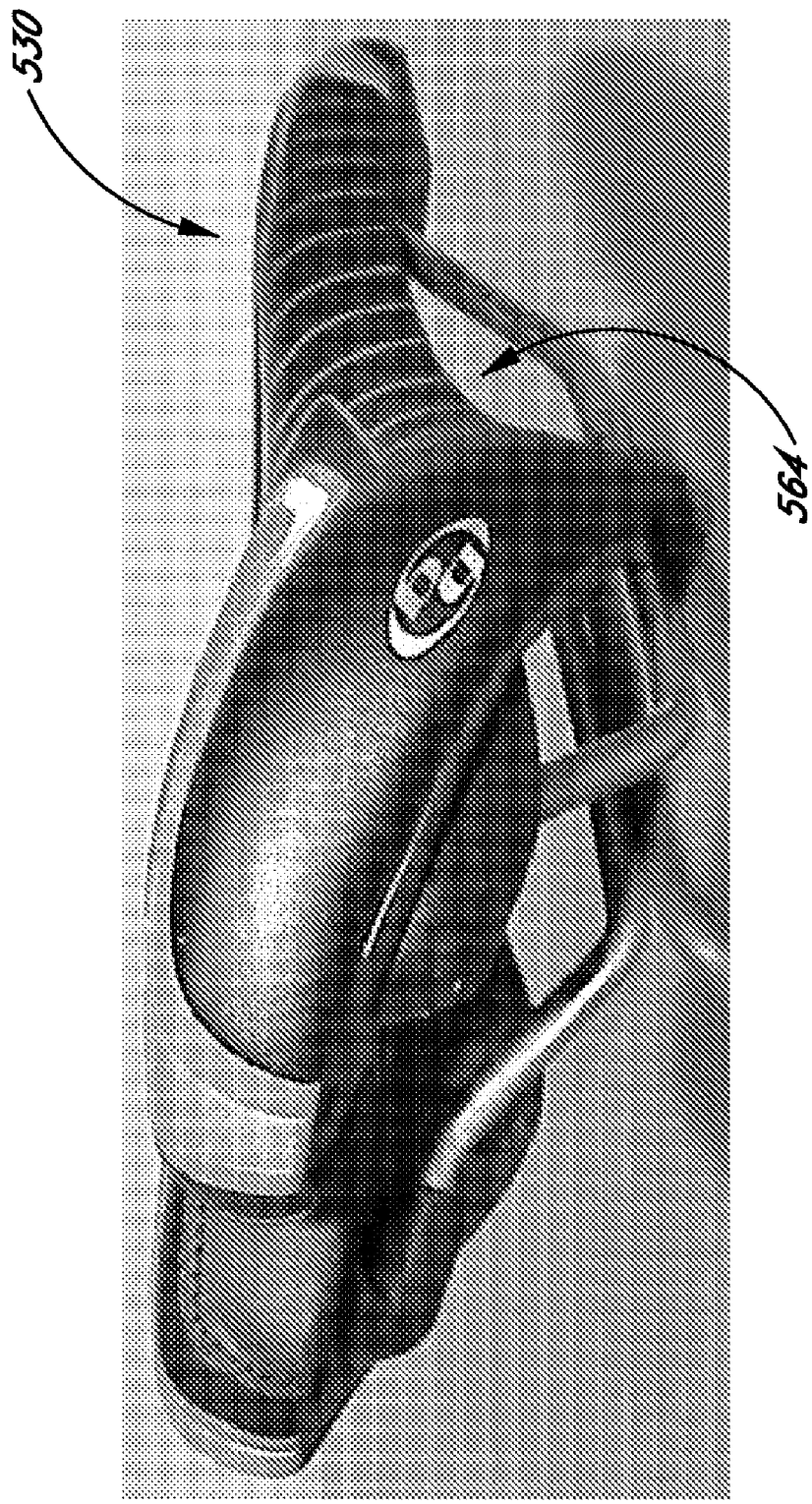
FIG. 11 is a rear perspective view of the saddle of FIG. 9.
Figure 12:
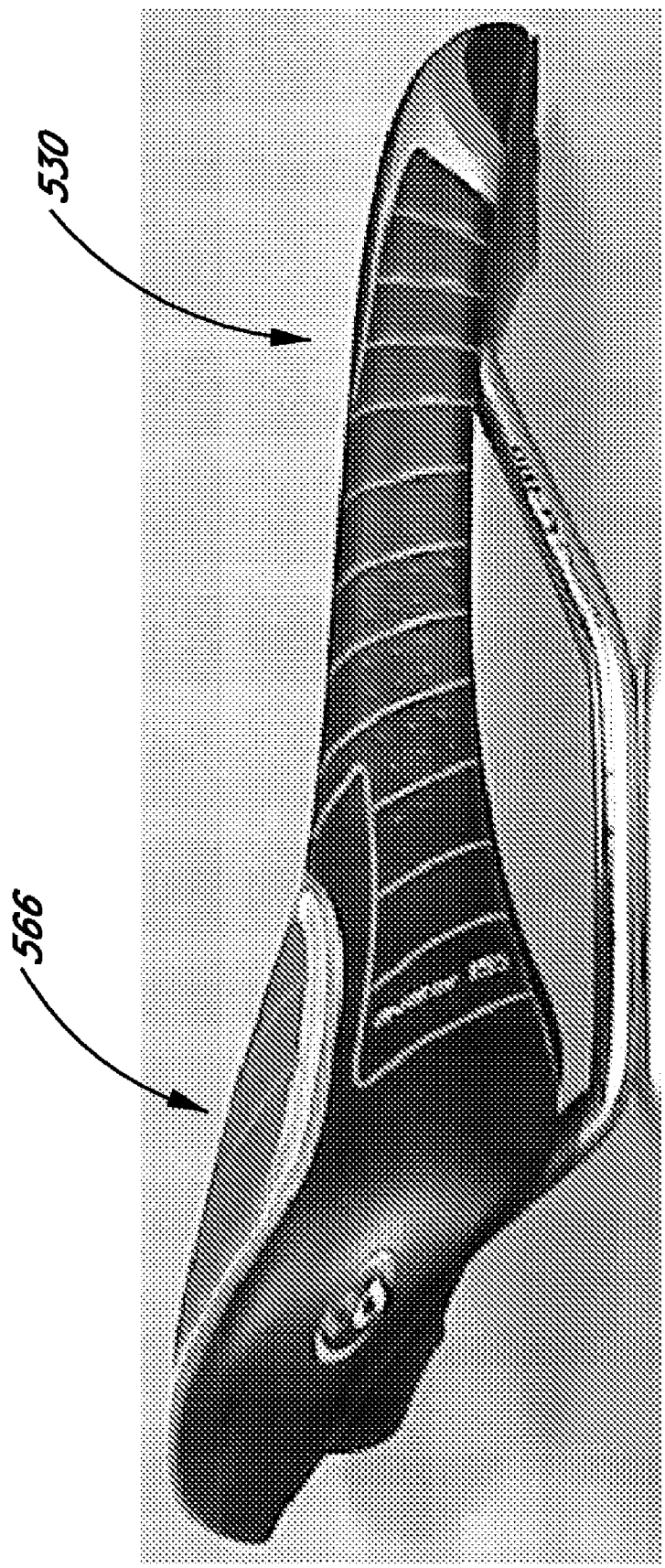
FIG. 12 is a side elevation view of the saddle of FIG. 9.

The 130/143/155 mm type designators correspond to the overall widths of the depicted saddles. However, other saddle shape characteristics, best seen in FIGS. 9-12, may be more relevant to the suitability of a particular saddle to a particular combination of sit-bone width and preferred riding posture. These saddle shape characteristics include (but are not limited to): (a) the flatness or concavity of the upper surface 560; (b) the degree to which the upper surface 560 slopes downward to the sides and/or front of the saddle, as indicated at 562, 564, respectively; (c) the degree to which the saddle tapers laterally outward as it extends rearward (see FIG. 9); and/or (d) the front-to-rear slope of the rearward upper surface 566. In the depicted embodiment, the following general trends are observed in the above-listed characteristics as corresponding to increasing sit-bone width and/or more-upright preferred riding posture: in characteristic (a), increasing flatness (and decreasing concavity); in characteristic (b), steeper slopes with points of origin further from the longitudinal centerline or rear of the saddle; in characteristic (c), a "sharper" outward taper; and in characteristic (d), a steeper slope.

Accordingly, the 130/143/155 mm type designators in the depicted embodiment can serve as proxies for these more relevant (but potentially more difficult to specify to a user) saddle shape characteristics. Such a use of the saddle-type designators can be implemented by building or designing into the "130 mm" saddle the saddle shape characteristics most suitable for riders who have narrow sit-bone widths and prefer aero or midrange riding postures per the chart in FIG. 7. Similarly, the "143 mm" and "155 mm" saddles can be given the saddle shape characteristics which are most suitable for riders having the combinations of sit-bone width and preferred indicated in the chart as corresponding to those saddles.

The overall saddle widths used to identify the saddle types thus refer to a saddle characteristic which is secondary in terms of saddle fit but which makes the selection of the appropriate saddle type easy and intuitive for the user, as increasing overall saddle widths correspond to increasing sit-bone width. To support saddle choice in this manner, a range of saddle types can be provided (such as, but not limited to the group 500 shown in FIG. 8). Preferably, the 130/143/155 mm type designators are printed or otherwise set forth, either permanently or temporarily, on the saddles themselves and/or on the saddle packaging or other display items associated with the saddles.

Alternatively, other saddle type designators can be employed in place of the overall-width designators discussed above, e.g. "type 1/type 2/type 3;" "small/medium/large;" etc. Whether the overall-width designators or other saddle type designators are used, the range of saddles provided (and the number of type designators used) can be fewer or greater than the three illustrated herein.

The chart depicted in FIG. 7 (or a variant thereof, prepared pursuant to the alternatives disclosed above) can be provided to the user to consult in making a saddle selection. Alternatively, some other summary or listing of saddle types appropriate for particular sit bone width-preferred riding posture combinations can be provided in lieu of the chart. The chart, summary, etc. preferably identifies the appropriate saddles by setting forth the same saddle type designators as are set forth on the saddles/packaging/etc. as discussed above.

The above-described chart, summary, etc. can be set forth on the fitting tool 200, e.g. on a reverse side thereof. Likewise, illustrations similar to FIGS. 4-6 can be set forth on the fitting tool 200, e.g. on the reverse side thereof, along with instruction text to assist the user in making measurements.

Figure 13:
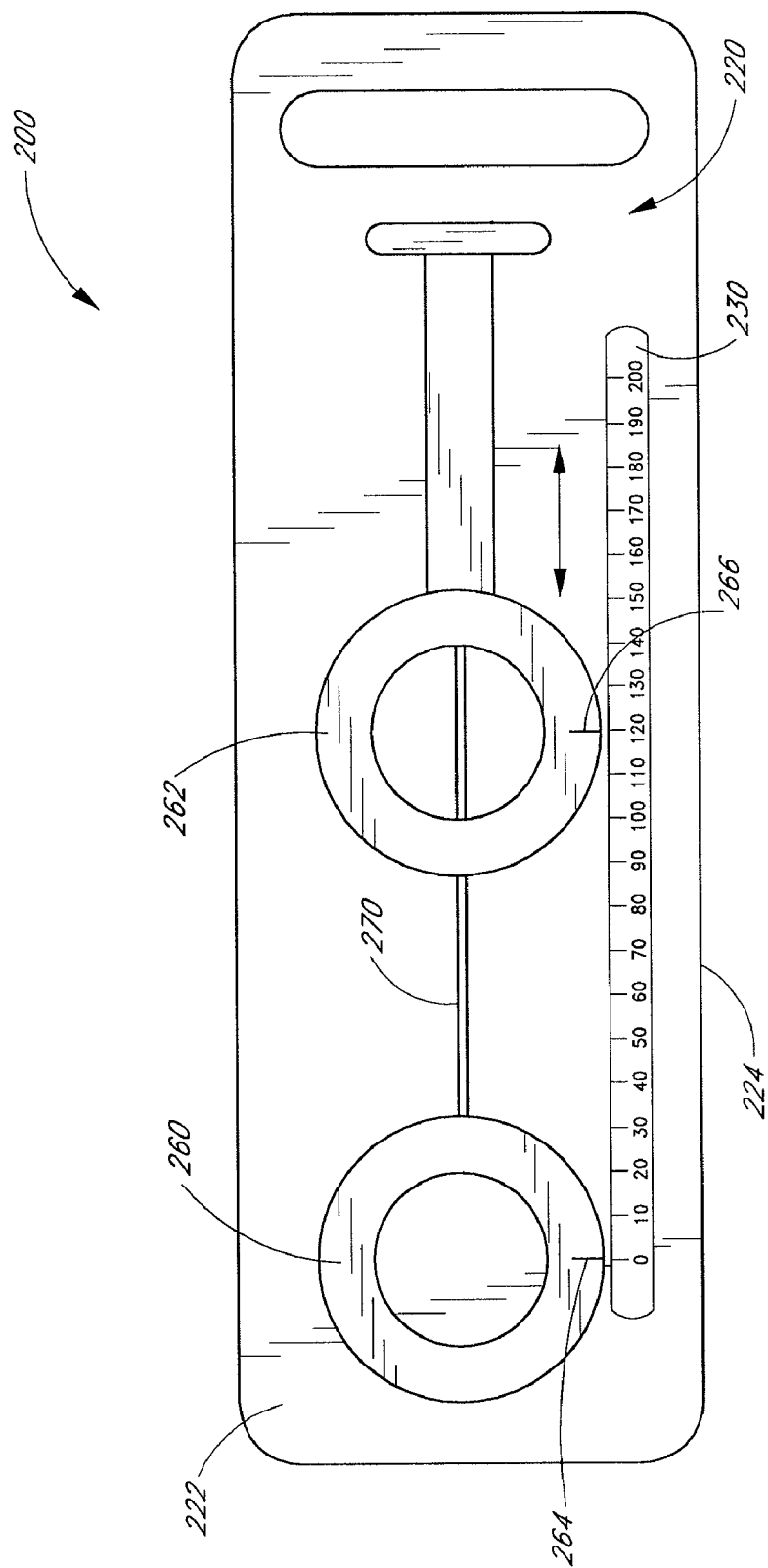
FIG. 13 is a plan view of another embodiment of the fitting tool.

FIG. 13 depicts another embodiment of the fitting tool 200. The embodiment of FIG. 13 can be generally similar to any of the other embodiments of the fitting tool 200 disclosed herein, except as further described below. In addition, the fitting tool 200 of FIG. 13 can be used in practicing any of the methods disclosed herein for fitting a saddle to a user.

The fitting tool 200 of FIG. 13 includes first and second depressions or fitting cups 260, 262 which are employed in place of the impression pad 210 discussed above. As illustrated in FIG. 13, the substrate 220 can define a slot or groove 270 that extends longitudinally along the substrate and to which the first and second cups 260, 262 can be coupled for permitting slidable longitudinal movement of at least one of the first and second cups 260, 262 along the substrate 220. Preferably, the first fining cup 260 is fixed and immovable with respect to the substrate layer 220, while the second fitting cup 262 is slidable longitudinally relative to the first cup 260. Alternatively both of the cups 260, 262 can be made slidable relative to the substrate layer 220. The cups 260, 262 depicted in FIG. 13 have a circular configuration; however, other shapes may be employed, such as oval, square, etc. Preferably, the cups 260, 262 are formed from a relatively rigid material such as a plastic or acrylic.

To measure sit-bone width, a user first sits on the fitting tool 200 in the manner discussed above, but with one sit bone centered or located in the first (fixed) cup 260. The user then slides the second cup 262 until it is positioned underneath the user's other sit bone, and sits on the tool 200 momentarily with one sit bone located in each of the cups 260, 262, to confirm that the cups are properly centered and indicative of the user's true sit bone width.

The user's sit bone width can then be read from the measurement gauge 230 located adjacent the cups 260, 262, based on the positions of the cups and their respective indicators 264, 266. In the measurement illustrated in FIG. 13, the user's sit bone width is 120 mm. After measurement, the user's sit bone width can be used alone, or in conjunction with other information as discussed above, to fit a saddle to the user.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular embodiments described above, but should be determined only by a fair reading of the claims that follow.

What is claimed is:

1. A bicycle saddle fit system comprising:
   a substrate of sufficient size to span the sit bones of an adult human;

a support being coupled to the substrate and being fixed relative to the substrate for receiving at least one of the sit bones;

a measurement gauge being positioned relative to the substrate for enabling a sit-bone width of the adult human to be measured;

first and second indicators coupled to the substrate and positioned adjacent the measurement gauge, at least one of the first and second indicators being selectively moveable along the substrate such that the measurement gauge and the substrate are moveable relative to at least one of the first and second indicators to locate the sit bones and to define a sit bone width.

2. The bicycle saddle fit system of claim 1, wherein the first and second indicators further comprise respective first and second supports configured to receive a respective sit bone.

3. The bicycle saddle fit system of claim 2, wherein the first and second supports are fitting cups.

4. The bicycle saddle fit system of claim 3, wherein the substrate is a substantially flat layer extending beyond a periphery of each of the first and second supports.

5. The bicycle saddle fit system of claim 2, wherein the first and second supports are formed separately from the substrate.

6. The bicycle saddle fit system of claim 1, wherein the first and second indicators are each selectively moveable relative to the substrate.

7. The bicycle saddle fit system of claim 1, wherein the at least one of the first and second indicators is linearly slidable along the substrate.

8. The bicycle saddle fit system of claim 1, wherein the measurement gauge extends along the substrate.

9. The bicycle saddle fit system of claim 8, wherein the measurement gauge comprises a scale that is coupled to the substrate.

10. The bicycle saddle fit system of claim 9, wherein the scale extends at least intermediate the first and second indicators to provide a visual indication of the sit bone width.

11. The bicycle saddle fit system of claim 1, wherein the measurement gauge is fixed to the substrate.

12. The bicycle saddle fit system of claim 1, wherein the substrate comprises a slot extending longitudinally along the substrate.

13. The bicycle saddle fit system of claim 12, wherein at least one of the first and second indicators is selectively moveable along the slot of the substrate.

14. The bicycle saddle fit system of claim 12, wherein the slot of the substrate is a single, continuous slot.

15. The bicycle saddle fit system of claim 1, wherein the support is a fitting cup.

16. The bicycle saddle fit system of claim 1, wherein the support is a first support that receives a first sit bone, and wherein the system comprises a second support for receiving a second sit bone.

17. The bicycle saddle fit system of claim 16, wherein the first support comprises a first fitting cup and the second support comprises a second fitting cup.

18. The bicycle saddle fit system of claim 16, wherein the first and second indicators are affixed to the respective ones of the first and second supports.

19. The bicycle saddle fit system of claim 1, wherein one of the first and second indicators is affixed to the support.

20. The bicycle saddle fit system of claim 1, wherein the first and second indicators are directly coupled to the substrate layer.

21. The bicycle saddle fit system of claim 1, wherein the first and second indicators are each configured to indicate a location of a center of a respective sit bone.

22. A bicycle saddle fit system comprising:

a substrate of sufficient size to span the sit bones of an adult human;

a support being coupled to the substrate and being fixed relative to the substrate for receiving at least one of the sit bones;

first and second indicators being coupled to the substrate and each being configured to indicate a location of a respective sit bone, the first and second indicators defining a relative spacing therebetween, the first indicator being selectively moveable along of the substrate relative to the second indicator to adjust the relative spacing of the first and second indicators in order to locate the sit bones and to define a sit bone width; and a measurement gauge configured to measure and visually display the sit bone width based on the relative spacing of the first and second indicators.

23. The bicycle saddle fit system of claim 22, wherein both of the first and second indicators is moveable relative to the substrate.

24. The bicycle saddle fit system of claim 22, wherein the measurement gauge extends along the substrate.

25. The bicycle saddle fit system of claim 22, wherein the measurement gauge is coupled to the substrate and comprises a scale.

26. The bicycle saddle fit system of claim 25, wherein the scale extends intermediate the first and second supports to visually display the sit bone width.

27. A method of fitting a bicycle saddle to a human rider, said method comprising:

setting a first sit bone of the rider onto a support of a fitting tool, the support of the fitting tool being fixed relative to a substrate of the fitting tool;

locating the first sit bone of the rider relative to a measurement gauge of the fitting tool using a first indicator of the fitting tool;

sliding a second indicator of the fitting tool along the substrate of the fitting tool to locate a second sit bone of the rider;

reading a sit bone width from the measurement gauge of the tool; and assessing a saddle characteristic suitable for the rider based on the rider's sit-bone width.

28. The method of claim 27, further comprising determining a preferred riding posture of the rider.

29. The method of claim 28, wherein the assessing step further includes assessing a saddle characteristic suitable for the rider based on the rider's preferred riding posture.

30. The method of claim 27, wherein assessing a saddle characteristic step further comprises determining a saddle width which is suitable for the rider.

* * * * *